United States Patent [19]
Roskey

[11] Patent Number: 5,709,419
[45] Date of Patent: Jan. 20, 1998

[54] WIND ENERGY COLLECTION

[76] Inventor: John E. Roskey, 7456 Old Hwy. 395, Carson City, Nev. 89704

[21] Appl. No.: 589,548

[22] Filed: Jan. 22, 1996

Related U.S. Application Data

[63] Continuation-in-part of Ser. No. 191,581, Feb. 3, 1994, abandoned.

[51] Int. Cl.$^6$ ................................. H02P 9/04; F03D 9/02
[52] U.S. Cl. ............................ 290/55; 416/90 R; 416/92; 416/223 R; 416/DIG. 4; 415/4.2; 415/905; 415/907; 415/914
[58] Field of Search ................. 415/1, 2.1, 4.1–4.5, 415/905, 907, 908, 914, 121.2; 416/90 R, 90 A, 91, 92, 223 R, 223 B, DIG. 4; 290/44, 55

[56] References Cited

U.S. PATENT DOCUMENTS

| | | |
|---|---|---|
| 4,002,023 | 1/1977 | Hartmann . |
| 4,504,192 | 3/1985 | Cyrus et al. . |
| 4,546,264 | 10/1985 | Pinson . |

FOREIGN PATENT DOCUMENTS

| | | |
|---|---|---|
| 450138 | 3/1913 | France . |
| 1195450 | 11/1959 | France . |
| 2379709 | 10/1978 | France . |
| 4002341 | 8/1990 | Germany . |

*Primary Examiner*—Christopher Verdier
*Attorney, Agent, or Firm*—Burns, Doane, Swecker & Mathis LLP

[57] ABSTRACT

A method and device for collecting energy from wind includes an airfoil having an outer surface defining a leading edge, a central section of greatest breadth adjacent to which a Bernoulli effect reduced pressure region results as an air flow passes over the airfoil from the leading edge to a trailing edge, an air passage contained within the outer surface, and a plurality of edge nozzles penetrating the outer surface within the section of greatest breadth. The edge nozzles each have an outlet orifice oriented toward the trailing edge and an inlet orifice feeding into the air passage and being positioned to communicate between the air passage and the Bernoulli effect reduced pressure region. The airfoil is positioned in the wind with the leading edge facing substantially into the wind and with the wind passing over the edge nozzles. An airflow-driven turbine capable of converting an airflow into rotational mechanical energy is also provided, the turbine being in airflow communication with the air passage. A flow of air is drawn through the airflow-driven turbine, thence through the air passage and out through the edge nozzles into the Bernoulli effect reduced pressure region created as the wind passes over the edge nozzles. The flow of air through the airflow-driven turbine drives the turbine and converts the flow of air into rotational mechanical energy.

14 Claims, 7 Drawing Sheets

WIND ENERGY COLLECTION

This is a continuation-in-part of U.S. patent application Ser. No. 08/191,581, filed on Feb. 3, 1994 now abandoned. That application is incorporated by reference herein.

BACKGROUND OF THE INVENTION

1. Field of the Invention

This invention relates generally to wind energy collection. More particularly, it relates to methods and devices for collecting energy from wind and converting it into useful energy forms.

2. Description of the Prior Art

There have been many wind energy collection methods and devices proposed in the prior art. Classic windmills and turbines employ vanes or propeller blade surfaces to engage a wind stream and convert the energy in the wind stream into angular force which rotates a horizontal shaft. These devices, with their exposed rotating blades, have posed technical as well as safety, environmental, and aesthetic concerns which have limited their use in today's world.

Horizontal axis wind turbines have become associated with many technical problems, including mechanical stress, wind gust and shadow shock, differential blade pitch control, active steering, and dynamic instability. Some of these problems, such as shadow shock which is caused by interactions between the moving blades and the stationary tower, are inherent in these designs. These problems may lead to material fatigue and catastrophic failure. In addition, the rotor blades or vanes of horizontal axis wind energy gathering turbines travel at high rates of speed and can endanger personnel. Additionally, very low frequency noise is generated by the blades as they pass into the wind shadow of the turbine support tower. This noise sometimes reaches such magnitude as to force project shutdown as occurred with the D.O.E. pilot program wind turbine in Boone, N.C.

Furthermore, and most importantly, the rotor blade and vane designs employed in horizontal axis wind turbines of the prior art generally cannot take advantage of high energy, high velocity winds. These high velocity winds can overload the turbines or moving blade systems and destroy them. In fact, it is typical to shut down conventional horizontal shaft wind turbine systems at wind speeds in excess of 35 mph to avoid this problem. Since wind energy increases as the cube of velocity, this represents a serious disadvantage in that at high wind velocities which offer high available energies, the systems must be shut down.

Vertical axis turbines are a more recent development. They, also, have been widely used. These machines address many of the shortcomings of the horizontal shaft devices but have their own inherent problems. Most vertical axis turbines are incredibly large, employing towers hundreds of feet in the air. They are expensive and have significant aesthetic impact.

Descriptions of various wind energy collection devices may be found, for example, in U.S. Pat. No. 4,546,264 issued to Pinson in 1985; U.S. Pat. No. 4,504,192 issued to Cyrus et al. in 1985 and U.S. Pat. No. 4,002,023 issued to Hartmann in 1977; as well as French patent publications 237909 (10-1978), 1195450 (11-1959) and 0450138 (3-1913) and West German patent publication 4002341 (8-1990).

It would be desirable to provide wind energy collection devices and methods which would overcome these shortcomings of the prior art.

STATEMENT OF THE INVENTION

A first object of this invention is to provide wind energy collection devices and methods that overcome the disadvantages of the prior art.

A second object of this invention is to provide wind energy collection systems that capitalizes on the Bernoulli or venturi effect to extract energy from wind without the use of moving parts.

A third object of the invention is to provide wind energy collection systems in which the collection components do not interfere with one another but, in fact, function together to enhance the collection capabilities of the system as a whole.

New devices and methods for collecting energy from wind have now been found. These new devices and methods overcome the shortcomings of the prior art by using one or preferably multiple wind energy collection columns and the like. These columns do not require moving parts, but include an airfoil cross-section such that when wind passes over the column an area of differential reduced air pressure is generated which can be accessed by an edge nozzle and utilized as a wind energy source.

In another embodiment, a plurality of columns is employed at least one of which has an airfoil cross-section. In this embodiment adjacent columns are located close enough to one another for the flow of air over the airfoil cross-sectioned columns to interact with the adjacent columns and create a Bernoulli/venturi effect between the columns. This Bernoulli/venturi effect gives rise to an area of low pressure which can be accessed by edge nozzles and utilized as an energy source.

This invention is an application of the Bernoulli/venturi effect which traps, and entrains and draws air molecules from an inner static volume of a nozzle and creates a low pressure within that static volume.

In accord with this invention, the individual or associated airfoils, which may make up an airfoil array or cascade, each has one or more edge nozzles located at the greatest breadth of the cross section of the airfoil for capitalizing on the Bernoulli effect. These edge nozzles feed air into the reduced (low) air pressure zone generated by the wind passing over the edge nozzles and their associated airfoil. One can collect the air flow through multiple edge nozzles by means of a manifold or the like. This flow of air into the low pressure zone can be used as a suction to draw against a pressure-connected turbine. The energy generated by the turbine can be used to power an electrical generator or other energy conversion device. The turbine and generator can be placed adjacent to the airfoil or can be placed remote from the airfoil. The present invention can effectively utilize an airfoil apparatus having a dual convex-like aerodynamic airfoil cross-section for accelerating the wind source, this airfoil further includes outlet nozzles disposed longitudinally and located substantially tangent to the greatest breadth of this airfoil. Using such an airfoil apparatus one can exploit the wind passing along the airfoil to cause a low pressure within the outlet nozzles and thus draw air out of the outlet nozzles. This flow of air to the outlet nozzles is collected via a manifold.

Thus, in one embodiment this invention provides a method of collecting energy from wind comprising the steps of:

a. providing an airfoil having an outer surface defining a leading edge, a central section of greatest breadth adjacent to which a Bernoulli effect reduced pressure region results as an air flow passes over the airfoil from leading edge to trailing edge, an air passage contained within the outer surface, a plurality of edge nozzles penetrating the outer surface, said edge nozzles each having an outlet orifice oriented toward the trailing edge and an inlet orifice feeding into the air passage and being positioned to communicate between the air passage and the Bernoulli effect reduced pressure region, b. providing an airflow-driven turbine capable of convening an airflow into rotational mechanical energy, said turbine being in airflow communication with the air passage, c. positioning the airfoil in the wind with the leading edge facing substantially into the wind and with the wind passing over the edge nozzles, d. permitting a flow of air to be drawn through the airflow-driven turbine, thence through the air passage and out through the edge nozzles into the Bernoulli effect reduced pressure region created as the wind passes over the edge nozzles, and e. permitting the flow of air through the airflow-driven turbine to drive the turbine and convert the flow of air into rotational mechanical energy.

In another embodiment this invention can provide a method of collecting energy from wind comprising the steps of:

a. providing a first body having a first outer surface and a second body defining an airfoil having a second outer surface, said first outer surface and said second outer surface being adjacent to one another and defining a wind passing zone, the second outer surface defining a leading edge, a central section of greatest breadth adjacent to which a Bernoulli effect reduced pressure region results as an air flow passes though the wind-passing zone over the airfoil from leading edge to trailing edge, an air passage contained within the outer surface, a plurality of edge nozzles penetrating the outer surface, said edge nozzles each having an outlet orifice oriented toward the trailing edge and an inlet orifice feeding into the air passage and being positioned to communicate between the air passage and the Bernoulli effect reduced pressure region, b. providing an airflow-driven turbine capable of converting an airflow into rotational mechanical energy, said turbine being in airflow communication with the air passage, c. positioning the first and second bodies in the wind with the airfoil leading edge facing substantially into the wind and with the wind passing through the wind passing zone and over the edge nozzles, d. permitting a flow of air to be drawn through the airflow-driven turbine, thence through the air passage and out through the edge nozzles into the Bernoulli effect reduced pressure region created as the wind passes over the edge nozzles, and e. permitting the flow of air through the airflow-driven turbine to drive the turbine and convert the flow of air into rotational mechanical energy.

In yet another embodiment the invention provides a device for collecting energy from wind comprising:

a. an airfoil having an outer surface defining a leading edge, a central section of greatest breadth adjacent to which a Bernoulli effect reduced pressure region results as an air flow passes over the airfoil from leading edge to trailing edge, an air passage contained within the outer surface, a plurality of edge nozzles penetrating the outer surface, said edge nozzles each having an outlet orifice oriented toward the trailing edge and an inlet orifice feeding into the air passage and being positioned to communicate between the air passage and the Bernoulli effect reduced pressure region, b. means for positioning the airfoil in the wind with the leading edge facing substantially into the wind and with the wind passing over the edge nozzles, c. an airflow-driven turbine capable of converting an airflow into rotational mechanical energy, said turbine being in airflow communication with the air passage, d. means for drawing a flow of air through the airflow-driven turbine, thence through the air passage and out through the edge nozzles into the Bernoulli effect reduced pressure region created as the wind passes over the edge nozzles, said flow of air through the airflow-driven turbine driving the turbine and converting the flow of air into rotational mechanical energy.

In yet an additional embodiment the invention provides a device for collecting energy from wind comprising:

a first body having a first outer surface, a second body defining an airfoil having a second outer surface, said first outer surface and said second outer surface being adjacent to one another and defining a wind passing zone, the second outer surface defining a leading edge, a central section of greatest breadth adjacent to which a Bernoulli effect reduced pressure region results as an air flow passes though the wind-passing zone over the airfoil from leading edge to trailing edge, an air passage contained within the second outer surface, a plurality of edge nozzles penetrating the second outer surface, said edge nozzles each having an outlet orifice oriented toward the trailing edge and an inlet orifice feeding into the air passage and being positioned to communicate between the air passage and the Bernoulli effect reduced pressure region, an airflow-driven turbine capable of converting an airflow into rotational mechanical energy, said turbine being in airflow communication with the air passage, such that when the first and second bodies are positioned in a windstream with the airfoil leading edge facing substantially into the wind and with the wind passing through the wind passing zone and over the edge nozzles, a flow of air is drawn through the airflow-driven turbine, thence through the air passage and out through the edge nozzles into the Bernoulli effect reduced pressure region created as the wind passes over the edge nozzles, which flow of air through the airflow-driven turbine drives the turbine and converts the kinetic energy present in the flow of air into rotational mechanical energy.

In additional embodiments, this invention provides edge nozzles which are equipped with concentrator wings to enhance the efficiency of air flow out through the edge nozzles. The system of the invention can also incorporate filters or animal exclusion screens on the intake side of the turbines so as to prevent dirt or animals from being drawn into the turbines with the flow of air.

BRIEF DESCRIPTION OF THE DRAWINGS

This invention will be further described with reference being made to the accompanying drawings. In these drawings

DESCRIPTION OF PREFERRED EMBODIMENTS

Figure 1:
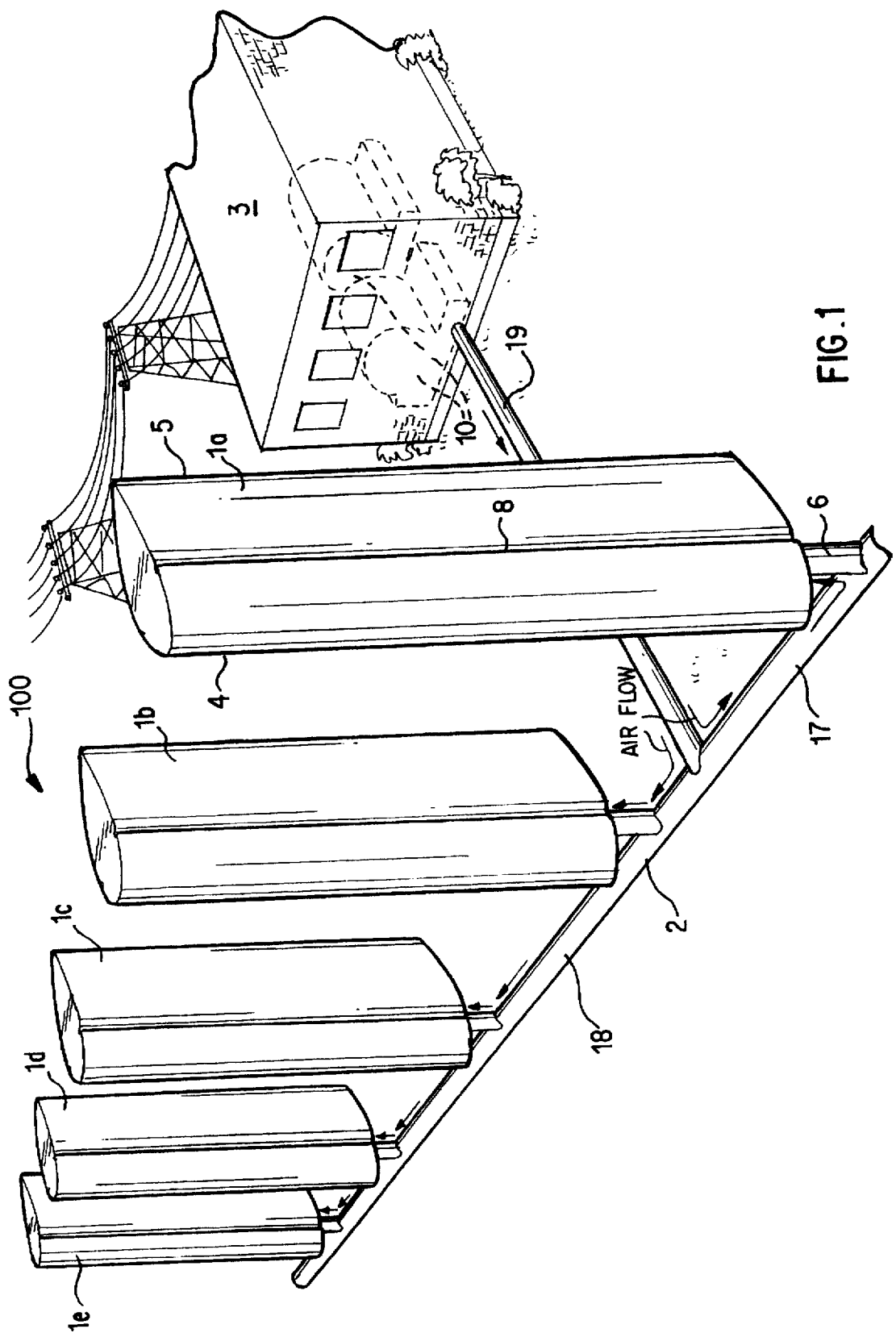
FIG. 1 is a perspective view of a wind energy collection system of this invention.
Figure 2:
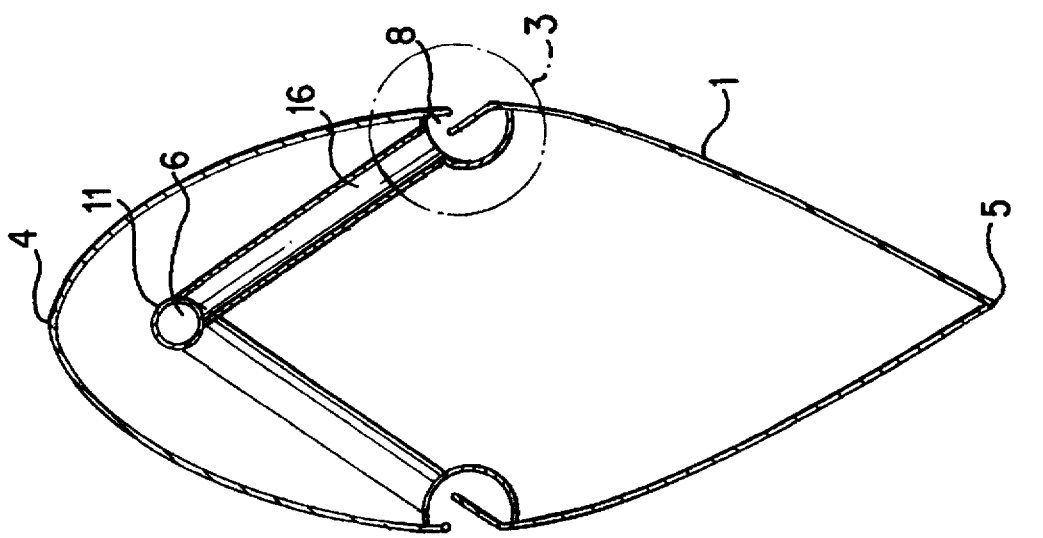
FIG. 2 is a cross sectional view of a typical airfoil which is employed in the invention.

The present invention provides methods and devices for collecting energy from wind. A key aspect of this invention is that the parts of the invention which contact the wind to collect energy from it do not employ moving parts. FIG. 1 provides an overall schematic view of such an energy collection system 100. In this preferred embodiment a energy system design comprising multiple airfoils 1a, 1b, 1c, 1d and 1e. As illustrated in detail in FIGS. 2, 3 and 3A, each of these airfoils 1a, 1b, 1c, 1d and 1e, hereinafter referred to generally as airfoil 1 and collectively as airfoils 1a-1e, has an outer surface which defines a leading edge 4 and a trailing edge 5 with at least one venturi edge nozzle 8 penetrating the surface at about the airfoil's greatest cross-sectional width. This edge nozzle 8 can be a single linear nozzle. An airstream A moving from the leading edge of the airfoil to the trailing edge creams a region of low pressure B (alternatively referred to as an area of "reduced" pressure or "negative" pressure, all to indicate that the pressure in the region is lower than the ambient barometric pressure) at the venturi edge nozzle. This reduced l0 pressure draws a low speed high volume flow of air (airflow C) through nozzle 8 into mixed air flow D. Airflow C is drawn from air E contained within air supply duct 9 which, in the embodiment shown in FIG. 3, in turn draws air from supply manifold 16 located within airfoil 1a, which in turn draws air through collection pipe 6. Collection pipe 6 is joined to a pressure network system made up of branches 17 and 18 and main line 19 which gathers the air flows out to the various airfoils 1a-1e etc and channels this flow back to a power generation facility 3 where energy contained in the stream of air flowing out toward the airfoils is used to drive turbine 10 which can, in turn, turn a generator to provide electric power. The turbine 10 is of a design known in the art.

Figure 10:
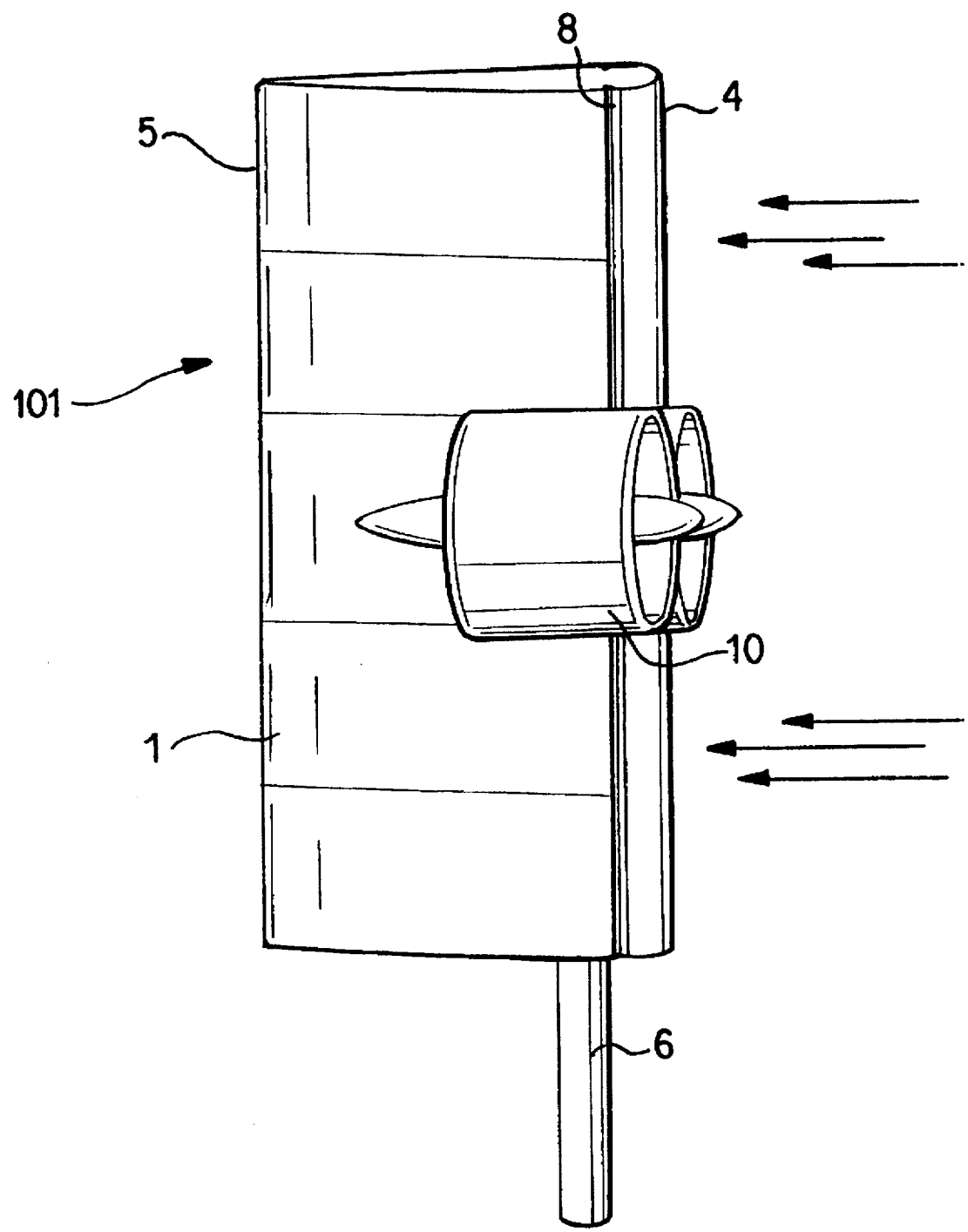
FIG. 10 is a perspective view of a wind energy collection system of this invention which is a stand-alone unit with the turbine being mounted adjacent to the linear edge nozzle-containing airfoil.

As shown in FIG. 1, turbine 10 can be located remote from airfoil 1. This is advantageous but not required. One can achieve the advantages of this invention even if the turbine is contained within or upon the airfoil 1 as is shown in FIG. 10.

Pipe 11 supports airfoil 1 so that it reaches into the windstream. Although not required, it is advantageous if airfoil 1 can pivot about pipe 11 so as to face directly into the wind stream. In this case, airfoil 1 has its leading edge 4 and its trailing edge 5 arranged to place the aerodynamic center of pressure aft of the pivot point 11 so as to cause the airfoil to point directly into the wind.

Thus, the airfoil includes a collection pipe 6, which is in pressure communication with the linear edge venturi nozzles 8 at either side of the airfoil 1 via manifold 16 and supply air duct 9 as well as the pressure network system 17 and 19.

Figure 3:
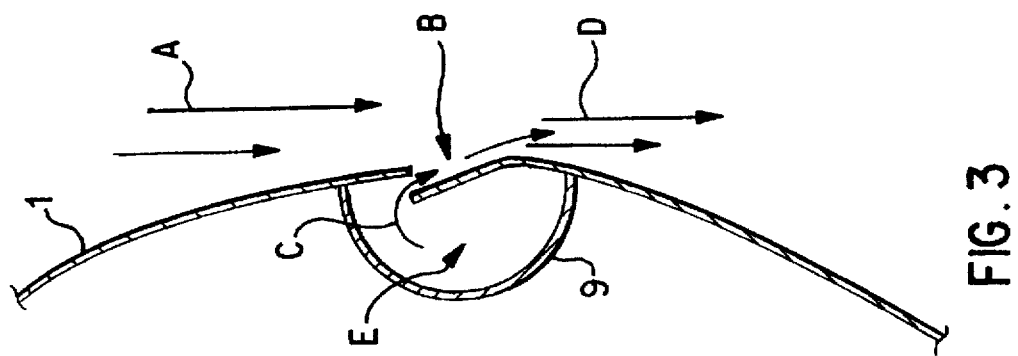
FIG. 3 is a detail view taken from FIG. 2 at 3–3' of a typical linear edge nozzle which is employed penetrating the outer surface of the airfoil showing the airflows which it achieves.
Figure 3A:
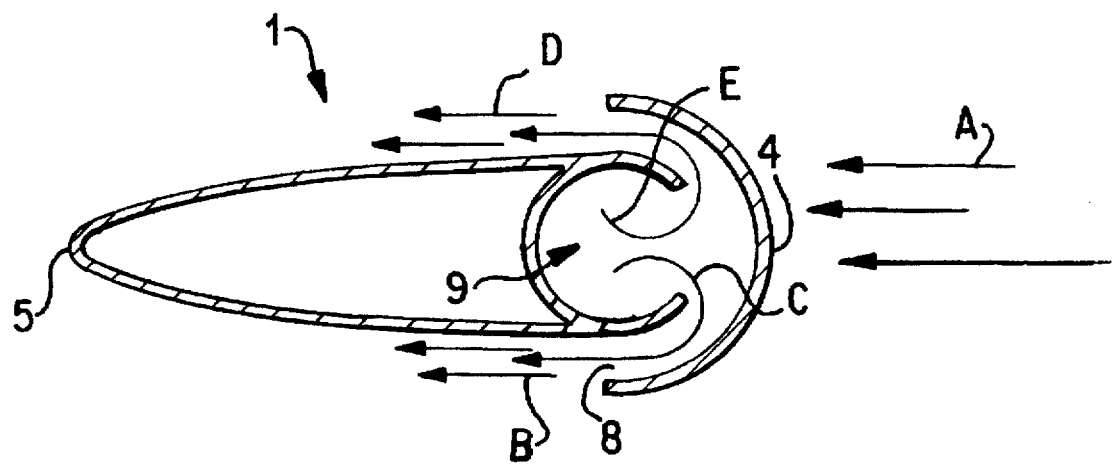
FIG. 3A is a cross sectional view of a further typical airfoil which is employed in the invention also showing the airflows which it achieves.
Figure 7A:
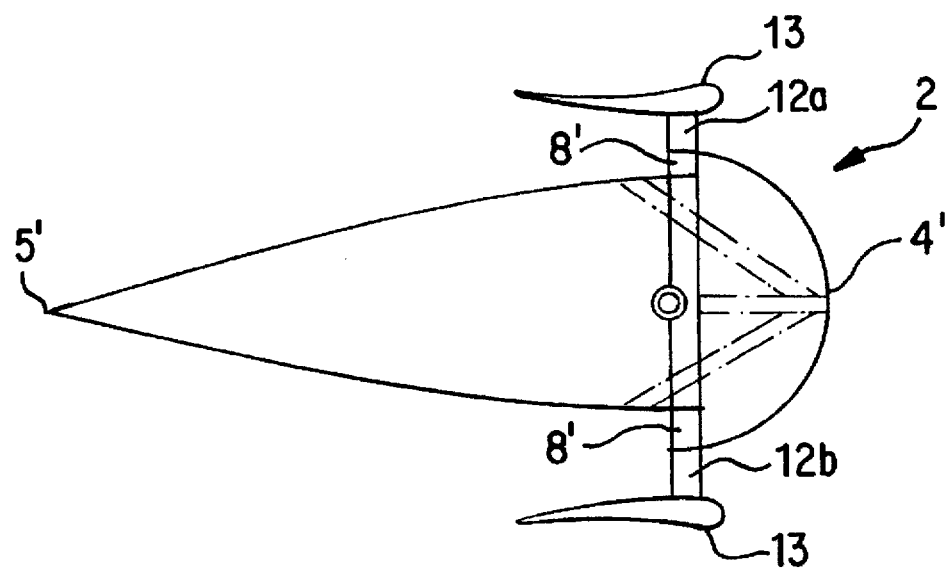
FIG. 7A shows an alternative configuration for the embodiment of the airfoil shown in FIG. 6 and 7.

As can be seen in FIGS. 3 and 3A, the linear edge venturi nozzle 8, demonstrates the Bernoulli principle. As moving airstream A passes alongside the airfoil 1 and over the edge nozzle 8, which is located at the region of airfoil 1 having the greatest cross-section,a it causes a low pressure area B into which an airflow C is drawn from within the stationary air supply duct 9. As shown in FIGS. 1 and 3A, the portion of the air foil 1 between edge nozzle 8 and trailing edge 5 remains substantially smooth and unpenetrated. When multiple airfoils are present multiple airflows will be generated which can be collected and compounded in order to provide an air flow to drive a turbine 10. The remote location of turbine 10 offers an additional advantage. The volume of air contained within supply duct 9, manifold 16, and the like tends to provide a dampening effect on wind flow and thus provides a more constant flow of air toward the turbine blades without potentially damaging gusts.

Figure 5:
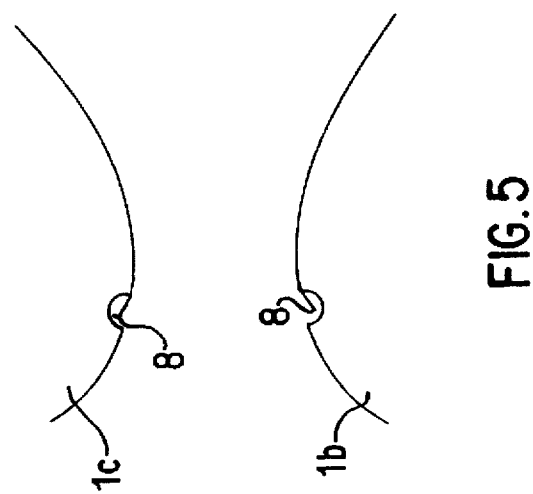
FIG. 5 is an isolated view of two airfoils and their linear edge nozzle positions accessing the area of reduced air pressure created by airflow through the gap between the two airfoils.
Figure 4:
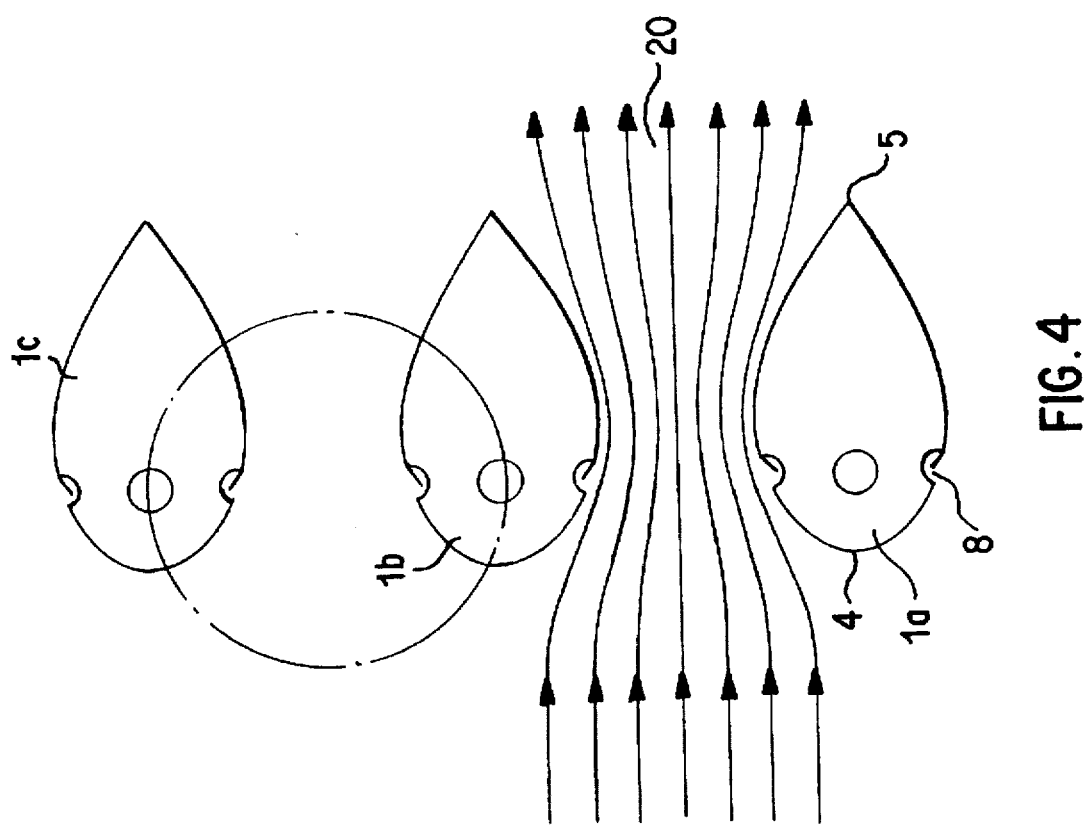
FIG. 4 is a top view of a wind energy collection array of the invention.

While this effect can be realized using one or more independent airfoils, it is advantageous to employ multiple airfoils which are spaced from one another so as to interact with one another. FIGS. 4 and 5 are overhead views of multiple airfoils 1a and 1b. FIG. 4 shows a typical linear airfoil array wherein each airfoil 1a, 1b and 1c enhances the ambient wind pattern for the adjacent airfoils by forming a series of throated ducts 20. As shown in FIG. 5, the linear venturi throat 20 so formed leads to increased pressure lowering effect for air flowing between the foils 1a and 1b as each foil increases the velocity of air over the other's edge nozzles 8 located in the throat of the venturi at essentially its narrowest position. In this way, the airfoils can be arranged in concert to magnify the collection capabilities of the system.

In the embodiment shown in FIGS. 1 through 5, the edge nozzles 8 can take the form of slotted ducts running up the widest section of the full length of airfoils 1a–1e. They can also take the form of tubes or multiple ducted slots all positioned to duct air outward into the area of low pressure created by the airfoil 1 at the point of greatest cross section.

It will be appreciated that the vertical orientation of airfoil 1 is not critical to the practice of this invention, while this configuration is preferred because it permits the airfoil to easily pivot and present its leading edge directly into the windstream, one could orient the airfoil in any position which allowed it to head into the wind.

Figure 6:
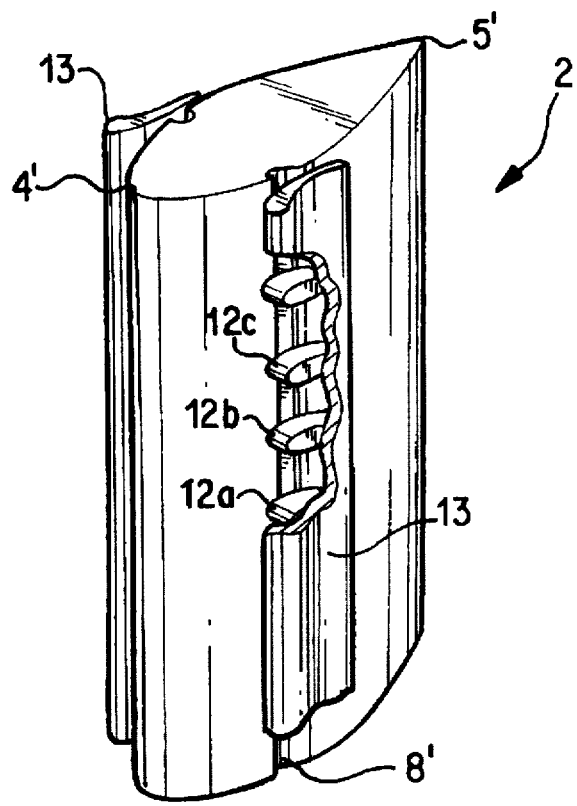
FIG. 6 is a partially cutaway perspective elevation view of an alternative embodiment of this invention having multiple airfoils arranged horizontally.
Figure 7:
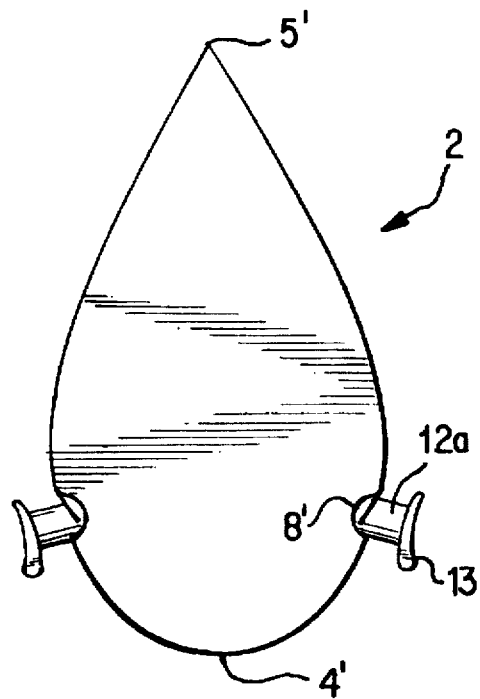
FIG. 7 shows a top or plan view of the embodiment of FIG. 6.

FIGS. 6 and 7 show an alternate embodiment of the airfoil which is denominated 2. Airfoil 2 would be used in place of one or more of airfoils 1a–1b etc in system 100. Airfoil 2 has the same airfoil configuration of airfoil 1 with leading edge 4' and trailing edge 5'. Airfoil 2 illustrates how a plurality of edge nozzles may be arrayed along the length of an airfoil, with these edge nozzles 8' also located at the wide region of the airfoil.

Figure 8:
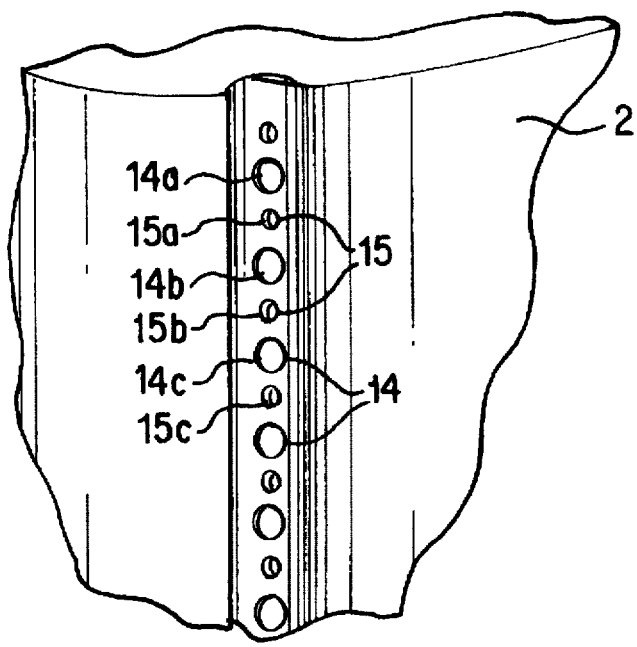
FIG. 8 shows a detail of an alternative design for the linear edge nozzles employed on the side of an airfoil.

Airfoil 2 additionally includes a group of smaller secondary airfoils 12, two of which are specifically identified as secondary airfoils 12a and 12b, also referred to as mini-sails. These secondary airfoils are arranged perpendicular to the outer surface of airfoil 2, which is a horizontal orientation when the primary orientation of the airfoil 2 is vertical. Secondary airfoils 12 are positioned adjacent to edge nozzles 8' so as to increase the venturi effect by increasing the speed at which air passes over the edge nozzles 8' and thus increasing the rate at which air is drawn out through the edge nozzles 8'. In addition to increasing the velocity of air over edge nozzles 8', these secondary airfoils 12 may themselves include edge nozzles (not shown) positioned on the secondary airfoils in the same orientation as the primary edge nozzles or placed on the primary airfoils. In this case, the airflow over the secondary edge nozzles will also be drawing air out of the secondary edge nozzles such that these nozzles need to be connected to the air flow manifold 16 (not shown) to contribute to the flow of air over the turbine 10. As illustrated in FIG. 8, these connections to the secondary airfoils can be through apertures (orifices) 15, three of which are specifically identified as apertures 15a, 15b and 15c, in airfoil 2 with the primary edge nozzles being shown by reference numeral 14, three of which are specifically identified as nozzles 14a, 14b, and 14c.

Airfoil 2, as shown in this embodiment, is shown as including an optional concentrator wing 13 which serves to duct air flow and increase the air flow over the smaller airfoils 12a, 12b, etc and thus to improve their efficiency. While a single concentrator 13 is shown, small, individual concentrators could be used on individual secondary airfoils 12a, 12b, etc.

Figure 9:
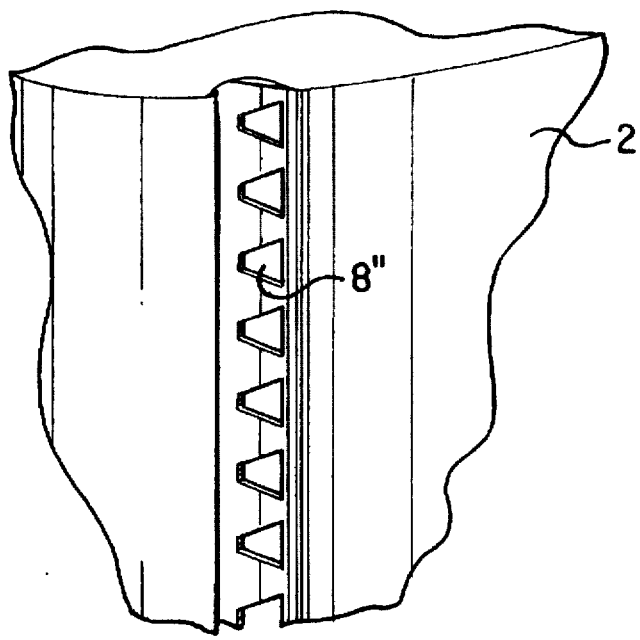
FIG. 9 shows an alternative embodiment having ducted slot edge nozzles along the side of the airfoil.

FIG. 9 shows another alternate embodiment in which the edge nozzles take the form of ducted slots. Any alternative configuration for edge nozzles should retain the same position at the broadest section of the airfoil and provide the same orientation to the airflow depicted in FIGS. 2 and 3.

Because this system in effect generates or allows the wind to generate a partial vacuum at the edge nozzles 8, the air in the system is of a controllable cleanliness since the air is actually drawn through the turbine 10 or power generation facility 3. This prolongs the life of the turbine blades and reduces the maintenance costs of the turbine operation. Also, the central turbine 10, supported by many airfoils 1, can be enclosed in a building 3 as shown in FIG. 1, rather than be exposed to the elements as is common in wind farms today. This in turn allows single point maintenance, lubrication, noise suppression, increased safety and security. Safety and performance may be further enhanced by positioning filters and/or animal exclusion screens in the air inlet areas through which air is drawn into the turbine.

FIG. 10 shows another embodiment 101 of the wind energy collection system of the invention. This is a stand alone system which employs the same airfoil 1 (or 2) as system 100 with support pole 6, leading edge 4, trailing edge 5 and edge nozzle 8. The difference here is that one or more turbines 10 are mounted adjacent to or upon the airfoil 1. These turbines are powered by a flow of air drawn through them by the action of air being drawn out through edge nozzles 8. The connection between the turbines and the edge nozzles is not shown but would involve an adaption of the manifolding system 9 plus 16 depicted in FIG. 2.

Many modifications and variations of the present invention are possible in light of the above teachings. It is therefore to be understood that, within the scope of the appended claims, the invention may be practiced other than as specifically described.

What is claimed is:

1. A method of collecting energy from wind comprising the steps of:
   a. providing an airfoil having an outer surface defining a leading edge, a central section of greatest breadth adjacent to which a Bernoulli effect reduced pressure region results as an air flow passes over the airfoil from the leading edge to a trailing edge, a trailing section defined between said section of greatest breadth and the trailing edge, an air passage contained within the outer surface, and at least one edge nozzle penetrating the outer surface within said section of greatest breadth, said at least one edge nozzle having an outlet orifice oriented toward the trailing edge and an inlet orifice feeding into the air passage and being positioned to communicate between the air passage and the Bernoulli effect reduced pressure region, the outer surface within said trailing section being substantially smooth and unpenetrated,
   b. providing an airflow-driven turbine capable of converting an airflow into rotational mechanical energy, said turbine being in airflow communication with the air passage,
   c. positioning the airfoil in the wind with the leading edge facing substantially into the wind and with the wind passing over the at least one edge nozzle,
   d. permitting a flow of air to be drawn through the airflow-driven turbine, thence through the air passage and out through the at least one edge nozzle into the Bernoulli effect reduced pressure region created as the wind passes over the at least one edge nozzle, and
   e. permitting the flow of air through the airflow-driven turbine to drive the turbine and thereby convert the flow of air into the rotational mechanical energy.

2. The method of claim 1 additionally comprising the step of:
   f. converting the rotational mechanical energy into electricity.

3. The method of claim 1 wherein the airfoil is positioned into the wind in step c. by pivoting upon a support pole which is hollow and additionally serves as a portion of the air passage.

4. The method of claim 1 wherein in step a. the airfoil is a member of an airfoil array, with adjacent airfoil members of the array being spaced to create a venturi therebetween.

5. A method of collecting energy from wind comprising the steps of:
   a. providing a first body having a first outer surface and a second body defining an airfoil having a second outer surface, said first outer surface and said second outer surface being adjacent to one another and defining a wind passing zone, the second outer surface defining a leading edge, a central section of greatest breadth adjacent to which a Bernoulli effect reduced pressure region results as an air flow passes though the wind-passing zone over the airfoil from the leading edge to a trailing edge, a trailing section defined between said section of greatest breadth and the trailing edge, an air passage contained within the outer surface, and a plurality of edge nozzles penetrating the outer surface within said section of greatest breadth, the outer surface within said trailing section remaining substantially smooth and unpenetrated, said edge nozzles each having an outlet orifice oriented toward the trailing edge and an inlet orifice feeding into the air passage and being positioned to communicate between the air passage and the Bernoulli effect reduced pressure region, b. providing an airflow-driven turbine capable of converting an airflow into rotational mechanical energy, said turbine being in airflow communication with the air passage, c. positioning the first and second bodies in the wind with the airfoil leading edge facing substantially into the wind and with the wind passing through the wind passing zone and over the edge nozzles, d. permitting a flow of air to be drawn through the airflow-driven turbine, thence through the air passage and out through the edge nozzles into the Bernoulli effect reduced pressure region created as the wind passes over the edge nozzles, and e. permitting said flow of air through the airflow-driven turbine to drive the turbine and convert said flow of air into the rotational mechanical energy.

6. The method of claim 5 additionally comprising the step of:

f. converting the rotational mechanical energy into electricity.

7. A device for collecting energy from wind comprising:

a. an airfoil having an outer surface defining a leading edge, a central section of greatest breadth adjacent to which a Bernoulli effect reduced pressure region results as an air flow passes over the airfoil from the leading edge to a trailing edge, a trailing section defined between said section of greatest breadth and the trailing edge, an air passage contained within the outer surface, and a plurality of edge nozzles penetrating the outer surface within said section of greatest breadth, the outer surface within said trailing section remaining substantially smooth and unpenetrated, said edge nozzles each having an outlet orifice oriented toward the trailing edge and an inlet orifice feeding into the air passage and being positioned to communicate between the air passage and the Bernoulli effect reduced pressure region, b. means for positioning the airfoil in the wind with the leading edge facing substantially into the wind and with the wind passing over the edge nozzles, c. an airflow-driven turbine capable of convening an airflow into rotational mechanical energy, said turbine being in airflow communication with the air passage, d. means for drawing a flow of air through the airflow-driven turbine, thence through the air passage and out through the edge nozzles into the Bernoulli effect reduced pressure region created as the wind passes over the edge nozzles, said flow of air through the airflow-driven turbine driving the turbine and converting said flow of air into the rotational mechanical energy.

8. The device of claim 7 wherein the means for positioning the airfoil includes a support pole about which the airfoil can pivot into the wind and wherein the support pole is hollow and comprises a portion of the air passage.

9. The device of claim 7 additionally comprising at least one secondary airfoil attached to said airfoil adjacent to said edge nozzles and oriented perpendicular to said airfoil.

10. The device of claim 9 additionally comprising wind concentrating means attached to said at least one secondary airfoil and increasing airflow past said edge nozzles.

11. A device for collecting energy from wind comprising:

a. a plurality of airfoils arrayed substantially parallel to one another and spaced apart from one another by a preselected distance with each of the airfoils having an outer surface defining a leading edge, a central section of greatest breadth adjacent to which a Bernoulli effect reduced pressure region results as an air flow passes over the airfoil from the leading edge to a trailing edge with the preselected distance being such that a venturi is formed and the regions of reduced pressure resulting from adjacent airfoils merge, an air passage contained within the outer surface of each airfoil, and a plurality of edge nozzles penetrating each outer surface, said edge nozzles each having an outlet orifice oriented toward the trailing edge and an inlet orifice feeding into the respective air passage and being positioned to communicate between the respective air passage and the respective Bernoulli effect reduced pressure region, b. means for positioning the airfoils in the wind with the leading edges facing substantially into the wind and with the wind passing over the edge nozzles, c. an airflow-driven turbine capable of converting an airflow into rotational mechanical energy, said turbine being in airflow communication with the air passages, and d. means for drawing a flow of air through the airflow-driven turbine, thence through the air passages and out through the edge nozzles into the Bernoulli effect reduced pressure regions created as the wind passes over the edge nozzles, said flow of air through the airflow-driven turbine driving the turbine and converting said flow of air into the rotational mechanical energy.

12. The device of claim 11 wherein the means for positioning the airfoils includes support poles about which the airfoils can pivot into the wind and wherein the support poles are hollow and comprise a portion of the air passages.

13. The device of claim 11 additionally comprising at least one secondary airfoil attached to respective ones of said airfoils adjacent to said edge nozzles and oriented perpendicular to said airfoils.

14. The device of claim 13 additionally comprising wind concentrating means attached to said at least one secondary airfoil and increasing airflow past said edge nozzles.

* * * * *